United States Patent [19]

Itoh et al.

[11] Patent Number: 4,994,224
[45] Date of Patent: Feb. 19, 1991

[54] INJECTION MOLDING DEVICE AND METHOD FOR MANUFACTURING A FOIL DECORATED MOLDING

[75] Inventors: Hisayuki Itoh, Nagaokakyo; Yuzou Nakamura, Mukou; Noriaki Higuchi, Ibaraki; Seiichi Yamasaki, Kyoto, all of Japan

[73] Assignee: Nissha Printing Co., Ltd., Kyoto, Japan

[21] Appl. No.: 362,467
[22] PCT Filed: Jul. 21, 1988
[86] PCT No.: PCT/JP88/00734
 § 371 Date: Mar. 16, 1989
 § 102(e) Date: Mar. 16, 1989
[87] PCT Pub. No.: WO89/00912
 PCT Pub. Date: Feb. 9, 1989

[30] Foreign Application Priority Data

Jul. 23, 1987 [JP] Japan .................................. 62-183889

[51] Int. Cl.$^5$ ...................... B29C 45/16; B29C 45/17
[52] U.S. Cl. ................................... 264/247; 264/40.2; 264/268; 264/335; 264/511; 425/126.1; 425/169; 425/444; 425/556
[58] Field of Search ............... 264/527, 247, 266, 267, 264/268, 335, 40.2; 425/126.1, 444, 169, 556

[56] References Cited

U.S. PATENT DOCUMENTS 4,124,352 11/1978 Posch ................................ 425/444
4,204,824 5/1980 Paradis ............................... 425/444
4,545,752 10/1985 Hanamoto et al. ............. 425/126.1
4,674,972 6/1987 Wagner ............................... 264/292
4,781,571 11/1988 Heindl et al. ....................... 425/444
4,795,597 1/1989 Whiteley et al. .................... 425/444

FOREIGN PATENT DOCUMENTS 132529 8/1983 Japan .................................. 264/511
164147 9/1984 Japan .................................. 264/247
61-137716 6/1986 Japan .
61-188117 8/1986 Japan .
44414 2/1987 Japan .................................. 264/511
128917 6/1988 Japan .
149122 6/1988 Japan .

Primary Examiner—James Lowe
Attorney, Agent, or Firm—Wenderoth, Lind & Ponack

[57] ABSTRACT

An injection molding device and a method for manufacturing a foil decorated molding use a first half of a mold and a second half of a mold with a transfer foil having a transfer layer on a substrate film transported into a space between the first half of the mold and the second half of the mold. A heating and removing device has a heating device and a molding removal device moved into the space to hold, with the removal device, a molding attached temporarily to the first half of the mold, and to heat the foil at the side of the second half of the mold with the heating device. When the first and second halves of the mold are closed, the heating and removing device is moved outside the space to remove the molding from the removal device.

17 Claims, 4 Drawing Sheets

4,994,224

INJECTION MOLDING DEVICE AND METHOD FOR MANUFACTURING A FOIL DECORATED MOLDING

TECHNICAL FIELD

The present invention generally relates to an injection molding device for manufacturing a foil decorated molding forming a transfer layer on the surface thereof by a transfer process at the same time that the molding is molded by injection molding, and an injection molding method for manufacturing the same. More particularly, the invention relates to an injection molding device and a method for manufacturing a foil decorated molding efficiently

BACKGROUND OF ART

Conventionally, various kinds of methods for manufacturing a foil decorated molding, which is molded by an injection molding process and has a transfer layer removed from a substrate film a transfer foil and placed on the surface of the molding after the transfer foil is inserted into cavities in an injection mold, have been known in the art. Since the use of the method requires an alignment of the transfer foil along a cavity-forming face of the mold, the transfer foil is preheated before the injection molding process so as to be easily aligned along the cavity-forming face of the mold where the cavity-forming face thereof is greatly recessed or projected from a parting face of the mold.

As one example in the art, an injection molding method shown in Japanese Laid-Open Patent Publication No. 58-132529 is constructed so that a heating means is put into and removed from a space between a first half of a mold and a second half of the mold in mold opening to heat a transfer foil before injection molding.

As another example thereof, an injection molding device for manufacturing a foil decorated molding, which is shown in Japanese Laid-Open Publication No. 59-31140, is constructed so that a heating means for heating a transfer foil is installed in a means for transporting a transfer foil. The heating means heats the foil while it is moved into a space between a first half of a mold and second half of the mold in mold opening.

However, there have been problems in that in these devices, the technique for removing a molding from the mold has no special consideration. That is, any of the techniques described above only disclose that the preheated transfer foil is set to the space between the first half of the mold and the second half of the mold in mold opening. After mold clamping, molten resin is injected into cavities in the mold, and the mold is open to remove the molding from the mold after the molding is cooled. In short, the molding removal operation is performed completely separate from the transfer foil heating operation. Therefore, the conventional techniques have problems in that the molding cycle becomes longer for an additional time when the molding removal operation is done separately from the heating operation, resulting in much lower productivity.

Accordingly, an essential object of the present invention is to provide an injection molding device and method for manufacturing a foil decorated molding in which, by use of a short time when a first half of a mold and a second half of the mold are opened relative to each other and a space is between the first half of the mold and the second half of the mold, both the molding removal operation and the transfer foil heating operation can be simultaneously performed to improve the productivity of the operation.

SUMMARY OF THE INVENTION

The present invention provides an injection molding device and a method for manufacturing a foil decorated molding constructed to achieve the above object as follows.

That is, the injection molding device for manufacturing a foil decorated molding according to the present invention comprises a first half of a mold (referred to as 'first half mold' hereinafter) having an injection opening confronting a cavity-forming face and a second half of the mold (referred to as 'second half mold' hereinafter) having a second parting face confronting a first parting face of the first half mold and arranged confronting the first half mold. A transfer foil transport means for transporting a long transfer foil has a transfer layer on a substrate film. A clamp clamps the transfer foil onto the second parting face of the second half mold. Further, a heating and removing means has a molding removal device and a heating device, each capable of entering into and moving outside a space between the first parting face of the first half mold and the second parting face of the second half mold in the mold opening. In the device the molding is held by the molding removal device at a side of the first half mold and the transfer foil is heated by the heating device at a side of the second half mold when the heating and removing means is positioned in the space of the mold opening. The molding held by the removal device is removed from the space when the heating and removing means is positioned outside the space during mold clamping.

The injection molding method for manufacturing a foil decorated molding according to the present invention comprises a step of transporting a long transfer foil having a transfer layer on a substrate film into a space, between a first half of a mold and a second half mold, of a mold opening. Molten resin is injected into cavities in the mold during mold clamping, and the mold is opened after the resin has cooled. The substrate film is removed from a foil decorated molding, temporarily attached to a cavity-forming face of the first half mold, to obtain the transfer of the transfer layer onto a molding surface. A heating and removing means has a heating device and a molding removal device moved into the space of the mold opening. The molding is temporarily held attached to the first half mold by the removal device during mold opening. The transfer foil positioned at a side of the second half mold during mold opening is heated by the heating device. The heating and removing means is moved outside the space during mold clamping, and the molding held by the removal device is moved from the space during mold clamping.

In the arrangement of the present invention, the long transfer foil having the transfer layer on the substrate film is transported into the space between the first and the second half molds one pitch (i.e. one transfer layer portion) during mold opening, and the molten resin is injected into the cavities after mold clamping. The mold is opened after it is cooled, and the substrate film is removed from the molding, the molding being temporarily attached to the cavity-forming face of the first half mold, to obtain the foil decorated molding with a transfer layer transferred onto the surface of the molding. During mold opening, the heating and removing means, with the heating device and the removal device, is guided into the space to hold the molding at the side of the first half mold and to heat the transfer foil at the side of the second half mold. During mold clamping, the means is moved outside the space to remove the molding held by the removal device therefrom.

Accordingly, the injection molding device and method for manufacturing a foil decorated molding of the present invention can obtain the following effects: that is, the heating and removing means having the heating device and the molding removal device, in which by use of a short time and the space during mold opening, has the molding held by the removal device and the transfer foil heated by the heating device before removing the molding from the space between the half molds during mold clamping. Therefore, the molding removal operation and the transfer foil heating operation can be performed at the same time, resulting in improved productivity, compared with conventional techniques in which both operations are separately performed.

BRIEF DESCRIPTION OF THE DRAWINGS

A preferred embodiment of the present invention is shown by the following drawings.

DETAILED DESCRIPTION OF THE PREFERRED EMBODIMENT

One embodiment of the present invention will now be described, with reference to the accompanying drawings.

Figure 1:
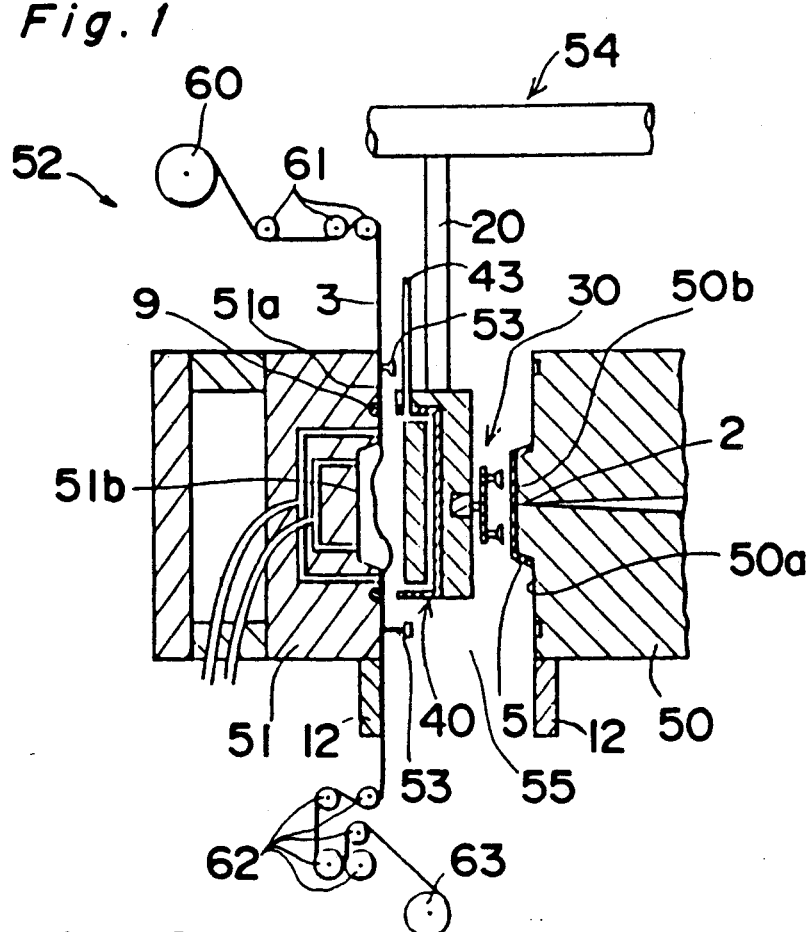
FIG. 1 is a longitudinally sectional view illustrating a state where a transfer foil is transported between a first half mold and a second half mold.

An injection molding device for manufacturing a foil decorated molding according to the present invention, as shown in FIG. 1, generally comprises a first half of a mold 50 (referred to as 'first half mold' hereinafter) having an injection opening 2 confronting a first cavity-forming face 50b protruding from the middle of a first parting face 50a. A second half of the mold 51 (referred to as 'second half mold' hereinafter) has a second parting face 51a confronting the first parting face 50a of the first half mold 50 and is arranged to confront the first half mold 50. A means 52 transports a long transfer foil 3 having a transfer layer on a substrate film. A clamp 53 is for clamping the transfer foil 3 on the second parting face 51a of the second half mold 51. A heating and removing means 54 heats the foil 3 in a mold opening and moves a molding from the mold.

The first half mold 50 has the first cavity-forming face 50b protruding from the middle of the first parting face 50a. Runners penetrate through the first half mold 50, a distal end of which opens on the first cavity-forming face 50b, to form the injection opening 2.

In the second half mold 51, a second cavity-forming face 51b is formed as a recess at the middle of the second parting face 51a, resulting in engagement of the second cavity-forming face 51b with the first cavity-forming face 50b to form cavities therebetween in mold clamping.

The heating and removing means 54 has an arm 20 capable of moving into and out of a space 55 formed between the first half mold 50 and the second half mold 51 when the mold is opened. A molding removal device 30 is arranged at the end of the arm 20 at a side confronting the first parting face 50a of the first half mold 50, and a heating device 40 is arranged at a side confronting the second parting face 51a of the second half mold 51.

Figure 2:
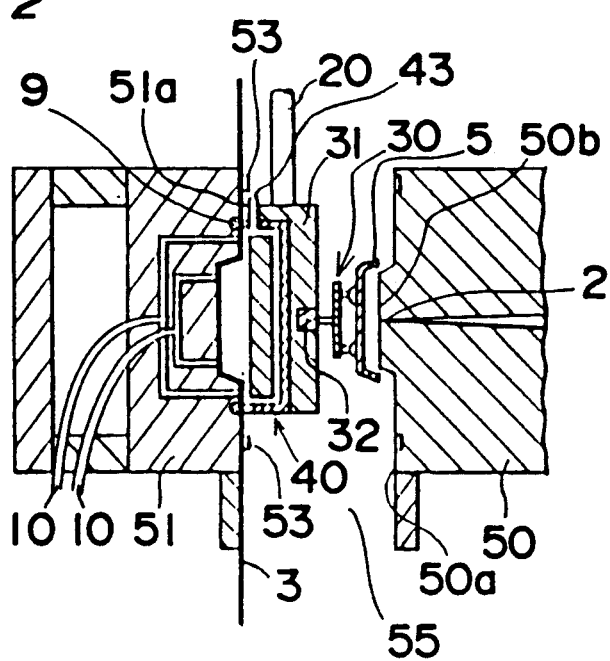
FIGS. 2 and 3 are, respectively, a longitudinally sectional view and a cross-sectional view illustrating a state where the transfer foil is heated by a heating device and a molding molded in the preceding cycle is held by a removal device of a heating and removing means.
Figure 3:
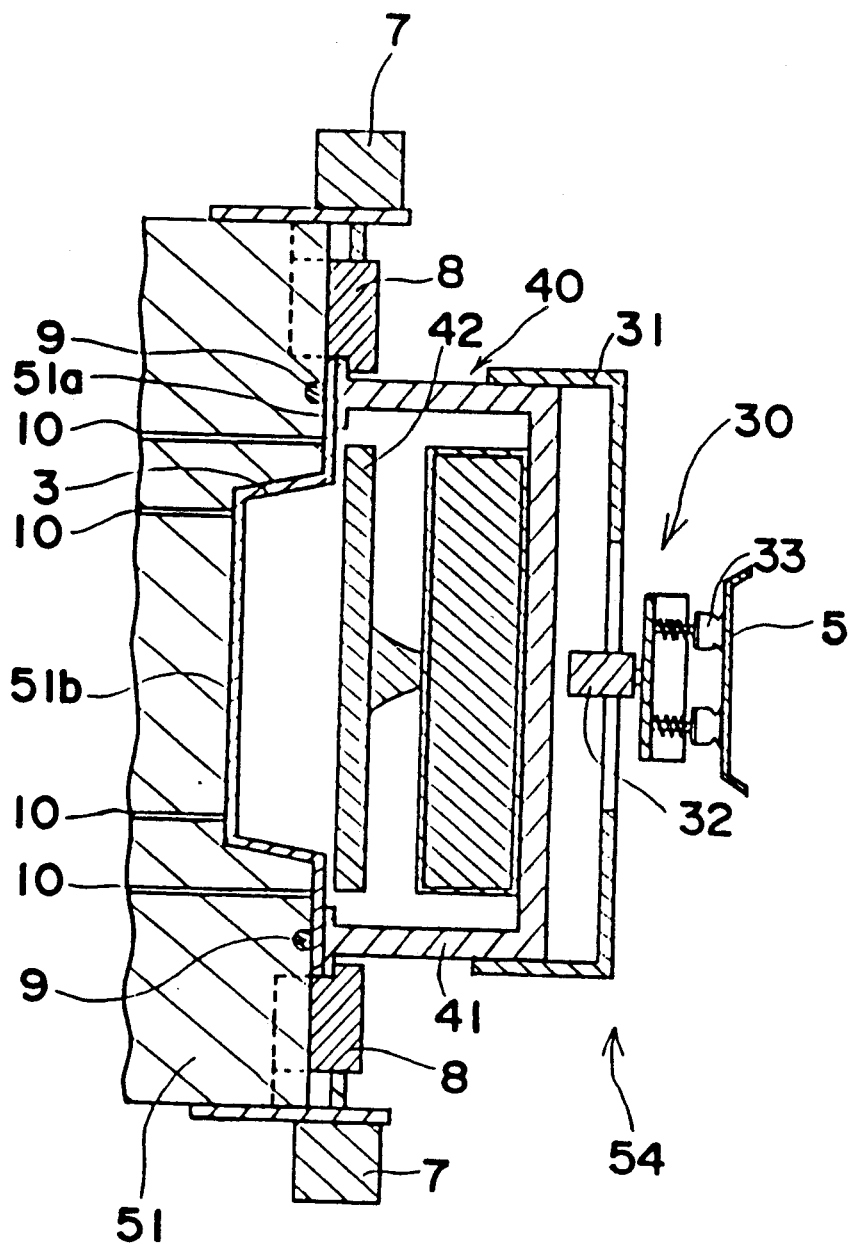

In the molding device 30, as shown in FIGS. 2 and 3, an attachment head 31 is fixed to the end of the arm 20, and an air cylinder 32 is installed on the attachment head 31. Suction cups 33 are installed on the end of the piston rod of the air cylinder 32. When the air cylinder 32 is driven, the suction cups 33 are moved in a horizontal direction towards the first cavity-forming face 50b of the first half mold 50 to hold a molding 5 temporarily attached to the first cavity-forming face 50b of the first half mold 50 which molding has been molded in the preceding cycle. The cups 33 are then moved in the opposite direction while holding the molding 5 to return to their original position. The method for holding the molding 5 may use a chucking method, such that the molding 5 is put in chucks, instead of driving the suction cups 33.

The heating device 40 is generally constructed so that an outer frame 41 is fixed to the attachment head 31 fixed to an end of the arm 20. A heating element 42 for heating the transfer foil 3 is provided on the outer frame 41. Movement of the arm 20 in the horizontal direction causes the heating element 42 to move in a direction nearer to the second cavity-forming face 51b. In the second half mold 51, plural air cylinders 7 are installed thereon near the second parting face 51a, and outer frame clamps 8 are installed on each piston rod of the air cylinder 7. Further, contact of the outer frame 41 with the second parting face 51a of the second half mold 51 causes a contactless switch (not shown) to operate, and will then cause the air cylinders 7 to drive. Thus, each of the outer frame clamps 8 can clamp the outer frame 41 onto the second parting face 51a of the second half mold 51. An O-ring 9 is installed on the peripheral portion of the second parting face 51a around the second cavity-forming face 51b of the second half mold 51, confronting a confronting face of the outer frame 41. Then, the transfer foil 3 is clamped between the lower end surface of the outer frame 41 and the O-ring 9 in the second parting face 51a of the second half mold 51 as the transfer foil 3 is positioned on the second parting face 51a of the second half mold 51. As examples of the heating element 52 in the outer frame 41, an extreme infrared radiation heater, a cartridge heater, a sheathed heater, a ceramic heater, etc. can be employed.

The means 52 for transporting the transfer foil 3 is constructed so that a virgin part of the foil 3 is transported through a transport roller 50 and guide rollers 61 into the space 55 between the first half mold 50 and the second half mold 51. A used part of the foil 3 is would up, through the guide rollers 62, by a wind-up roller 63.

Figure 7:
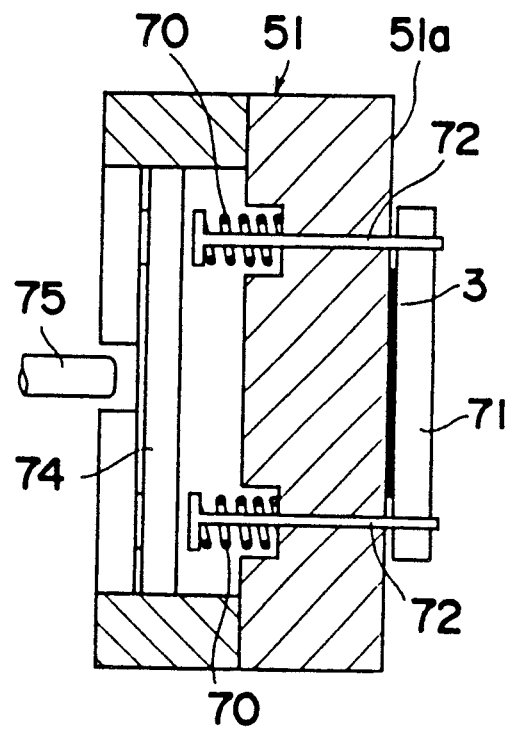
FIGS. 7 and 8 are, respectively, a plan view and a front view showing the clamp of FIG. 6 in mold clamping and a mold being released from clamping.
Figure 8:
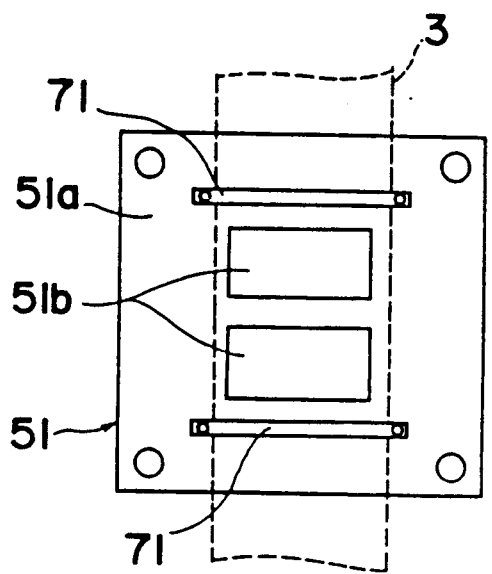
Figure 9:
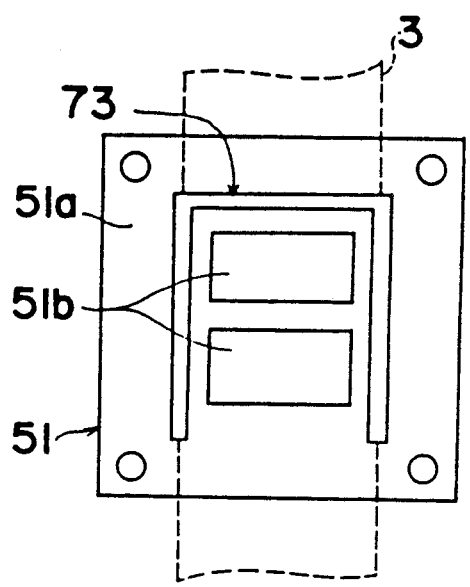
FIG. 9 is a front view showing another embodiment of the clamp means.

The clamp 53 is constructed as follows. As shown in FIGS. 7-9, it comprises stick-like transfer-foil-clamp members 71 extending in a wide direction of the foil 3, which are respectively arranged at the upper and lower ends of the second parting face 51a of the second half mold 51. Each end of each clamp member 71 is supported by a pin 72 penetrating through the second half mold 51. Each pin 72 is always urged by a spring 70 in the second half mold 71 in such a direction that each clamp member 72 contacts the second parting face 51a of the second half mold 51. A driving plate 74 is thus pressed by a driving rod 75, whereby the pins 72 are moved towards the first half mold 50 to separate the upper and lower clamp members 71 from the second parting face 51a. When the virgin part of the foil 3 transported by the foil transport means 52 is inserted between the pins 72 of each clamp member 71 to position the foil 3 at a specified position, the driving rod 75 is moved in a direction opposite to the above. Thus, by the bias force of the springs 70 each pin 72 is moved with each clamp member 71 so that the foil 3 is clamped onto the second parting face 51a to be held by the clamp members 71.

It is noted that a control means for controlling each of the above means, the mold, etc. and a control panel for operating the control means, are not shown in the figures.

The injection molding device for manufacturing a foil decorated molding having construction can be operated as follows.

Figure 4:
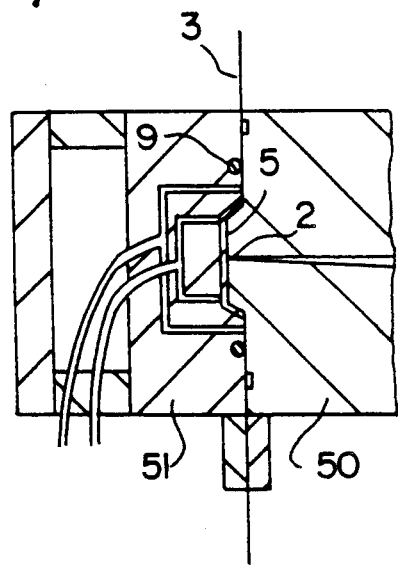
FIG. 4 is a longitudinally sectional view showing an injection molding state after mold clamping.

The first half mold 50 and the second half mold 51 are clamped as shown in FIG. 4 to form cavities between both of the cavity-forming faces 50b and 51b, and the foil 3 is positioned into the cavities at the side of the second cavity-forming face 51b. In this state, molten resin is injected through the injection opening 2 into the cavities to mold a molding 5.

Figure 5:
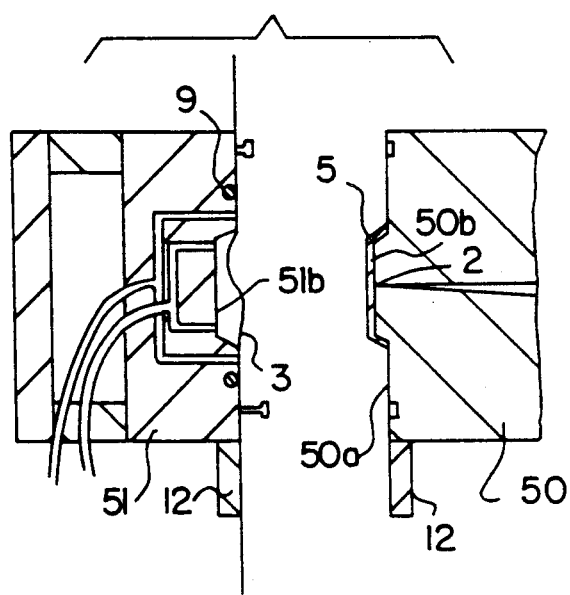
FIG. 5 is a longitudinally sectional view showing a state just after mold opening.
Figure 6:
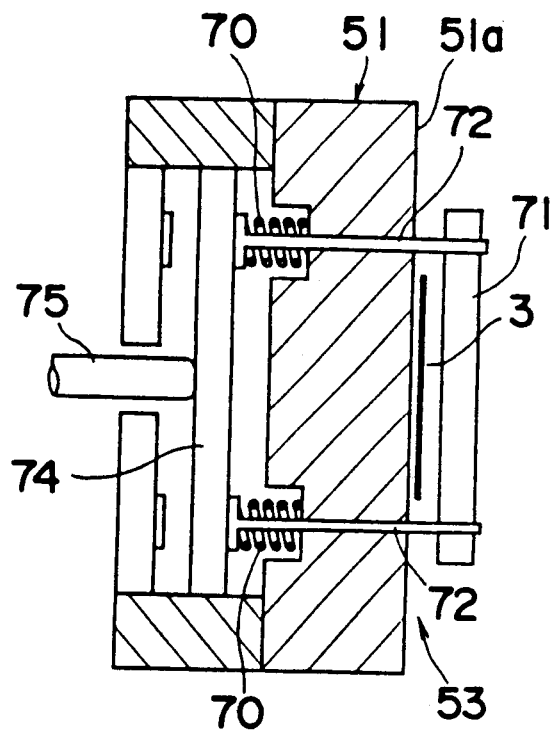
FIG. 6 is a plan view of one embodiment of a clamp while the mold is released from clamping.

Then after the molten resin is cooled and the first half mold 50 and the second half mold 51 are opened as shown in FIG. 5, the foil 3 is released from clamping by the clamp members 71. A virgin part of the foil 3 is then transported between the first half mold 50 and the second half mold 51 in a direction from upward to a position confronting the second cavity-forming face 51b with the foil transport means 52 so as to remove the spent part of the foil 3 from the position confronting the second cavity-forming face 51b. Then a mark printed on the foil 3 is detected by a photo-sensor (not shown) integrated into the foil transport means 52 to align the virgin part of the foil 3 with the second parting face 51a of the second half mold 51 in the up and down and right and left directions. Then the foil 3 is clamped onto the second parting face 51a by the clamp members 71. At the same time, as shown in FIG. 1, the arm 20 lowers to insert the heating and removing means 54 into the space 55 between the first half mold 50 and the second half mold 51 during the above operation.

After precise alignment of the foil 3 with the second parting face 51a is completed and the heating device 40 with the arm 20 is positioned at the position confronting the second cavity-forming face 51b, the arm 20 is moved in the horizontal direction towards the second half mold 51 to make the outer frame 41 of the heating device 40 contact with the second parting face 51a of the second half mold 51, as shown in FIGS. 1-3. At that time, according to control by the control panel on the basis of the operation of the contactless switch (not shown), as shown in FIG. 3, the air cylinders 7 arranged at the left side and the right side of the second half mold 51 are driven to clamp the outer frame 41 onto the second parting face 51a with the outer frame clamps 8. Then the foil 3 positioned on the second parting face 51a of the second half mold 51 is clamped so that the foil 3 is caught between the confronting face of the outer frame 41 which confronts the second parting face 51a of the second half mold 51 and the O-ring 9 on the second parting face 51a of the second half mold 51. After that, the foil 3 is heated by the heating element 42.

After the removal device 30 with the arm 20 is positioned at a position confronting the first cavity-forming face 50b of the first half mold 50, at the same time as the heating operation, the suction cups 33 are moved in the horizontal direction towards the first cavity-forming face 50b of the first half mold 50 by driving the air cylinder 32 installed on the attachment head 31 to hold the molding 5 molded in the preceding cycle, which molding 5 is temporarily attached to the first cavity-forming face 50b of the first half mold 50. The suction cups 33 holding the molding 5 return to their original position in the opposite direction to the above before the heating operation of the foil 3 by the heating device 40 finishes.

In the case where a mold is constructed so that the cavity-forming face is greatly recessed or protruded from the parting face, the following means can be, preferably, employed to align the foil 3 along the second cavity-forming face 51b of the second half mold 51 during heating operation of the foil 3. A compressed air supply pipe 43 is installed in the heating device 40 as shown in FIGS. 1 and 2, and plural vacuum holes 51b of the second half mold 51 are installed in the second half mold 51.

The foil 3 is then sucked toward the holes 10 and simultaneously pressed by compressed air supplied from the air supply pipe 43 to be completely aligned along the second supply pipe 43 is connected with a pressure reducing valve, a compressor (not shown), etc. through the control panel. Each vacuum hole 10 is connected with a vacuum pump (not shown) through the control panel.

The moment the heating operation of the foil 3 finishes, the clamping of each outer frame clamp 8 is released, according to instructions from the control means. Movement of the arm 20 in the horizontal direction toward the second half mold 51 causes the heating device 40 to separate from the second half mold 51. Then the arm 20 of the heating and removing means 54 rises and moves outside the space 55 to transport the molding 5 molded in the preceding cycle to a specified position. After the first half mold 60 and the second half mold 51 are closed and clamped at the same time in the molding operation, molten resin is injected from the injection opening 2 into the cavities as shown in FIG. 4 to form the molding 5, after cooling of the resin.

As shown in FIG. 5, the first half mold 50 and the second half mold 51 are opened, and then the molding 5 is temporarily attached to the first cavity-forming face 50b of the first half mold 50, which has the injection opening 2. At the same time, the substrate film of the foil 3 is removed from the transfer layer thereof and the layer is transferred onto the surface of the molding 5. The spent part of the foil 3 is transported outwardly one pitch thereof by the transport outwardly one pitch thereof by the transport roller 60 to be wound by the wind-up roller 64. Since the spent part of the foil 3 being transported outwardly is deformed, it is forced flat by a press block 12 arranged at the lower end of the first half mold 50 and the second half mold 51 so that irregularities of the foil 3 will be flattened in the mold clamping of the following cycle as shown in FIG. 4.

According to the injection molding device and method for manufacturing a foil decorated molding of the embodiment of the present invention, the following advantages will be obtained. That is, the heating and removing means 54 has the removal device 30 and the heating device 40 mounted back to back, which uses a short time and a small space in the mold opening cycle. The molding 5 is held by the removal device 30 and the transfer foil 3 is heated by the heating device 40 on the basis of operating the heating and removing means 54. The molding 5 can be removed from the space 55 between the first half mold 50 and the second half mold 51 during mold clamping. Therefore, the removal operation of the molding 5 and the heating operation of the foil 3 can be simultaneously performed, and this results in greatly improved productivity compared with conventional techniques in which both operations are separately performed.

The present invention is not limited to the embodiment described above; it can be put into practice in other various forms; for example, it can be constructed so that the second cavity-forming face 51b of the second half mold 51 is protruded therefrom and the first cavity-forming face 50b of the first half mold 50 is recessed. Instead of the arm 20, a carrier, etc. can enter into the space between the first half mold 50 and the second half mold 41 along guide rails to move the heating and removing means 54 thereinto. Furthermore, in the means 54, the removal device 30 and the heating device 40 are not limited to be mounted back to back. Moreover, as shown in FIG. 9, as the clamp means 53, a clamp member 73 connected integrally with an extended portion of the stick-like clamp member 71, extending downwardly from both ends of the clamp member 71, can be employed to clamp the transfer foil 3.

We claim:

1. An injection molding apparatus for manufacturing a foil decorated molding, comprising:
    a first mold half, said first mold half having a first surface defining a portion of a mold cavity and an injection port opening onto said first surface;
    a second mold half, said second mold half having a second surface defining a portion of said mold cavity, said second mold half being disposed so as to confront said first mold half;
    transfer foil transport means for transporting a transfer foil, said transfer foil comprising a transfer layer on a substrate film, said transfer layer comprising a plurality of transfers, and said transport means transporting said transfer foil across said second mold half one pitch of said transfer foil at a time;
    clamping means for clamping said transfer foil onto said second surface of said second mold half; and
    heating and removing means, movable between a first position between said first half mold and said second half mold when said first and second half molds are separated and a second position removed from between said first and second half molds, for heating the transfer foil at said second mold half in said first position and for removing a molding from said first half mold and moving the molding to said second position, said heating and removing means comprising a heating device and a molding removal device.

2. The injection molding apparatus as set forth in claim 1, wherein said heating device heats the transfer foil only while said heating device is at said first position.

3. The injection molding apparatus as set forth in claim 1, and further comprising a second clamping means for clamping said heating and removing means to said surface of said second half mold when said heating and removing means is in said first position.

4. The apparatus as set forth in claim 1, wherein said clamping means is disposed on said second mold half.

5. The apparatus as set forth in claim 4, wherein said clamping means comprises a plurality of clamping members movable mounted on said second mold half, said clamping members extending substantially perpendicularly to the direction of transport of said transfer foil.

6. The apparatus as set forth in claim 5, wherein said clamping means further comprises pins connected to said clamping members and springs biasing said pins in a direction to cause said clamping members to clamp said transfer foil to said second mold half.

7. The apparatus as set forth in claim 6, and further comprising means for disengaging said clamping members from said transfer foil to allow said transport means to move said transfer foil one pitch.

8. The apparatus as set forth in claim 1, wherein said heating and removing means comprises a movable arm having an attachment head connected thereto, said attachment head having said heating device attached to one side thereof and said molding removal device attached to an opposite side thereof.

9. The apparatus as set forth in claim 8, wherein said removal device comprises a plurality of suction cups.

10. The apparatus as set forth in claim 1, wherein said heating and removing means has a frame which, when heating the transfer foil in said first position, abuts the transfer foil, said second mold half having a seal thereon, whereby said frame and said seal hold the transfer foil therebetween during heating.

11. The apparatus as set forth in claim 1, wherein said transfer foil transport means comprises a transport roller and a wind-up roller for feeding out and winding-up the transfer foil, and a plurality of guide rollers disposed therebetween for guiding the transfer foil across said second mold half.

12. The apparatus as set forth in claim 11, wherein said heating and removing means, comprising said heating device and said molding removal device, are movable separately from said transfer foil transport means between said first and second positions.

13. The apparatus as set forth in claim 1, wherein said heating and removing means, comprising said heating device and said molding removal device, are movable separately from said transfer foil transport means between said first and second positions.

14. An injection molding method for manufacturing a foil decorated molding, comprising:
    providing a first mold half, said first mold half having a first surface defining a portion of a mold cavity and an injection port opening onto said first surface, and a second mold half, said second mold half having a second surface defining a portion of said mold cavity, said second mold half being disposed so as to confront said first mold half;
    transporting an elongated transfer foil, the transfer foil comprising a transfer layer on a substrate film, and the transfer layer comprising a plurality of transfers, into a position adjacent said second surface in a space between said first mold half and said second mold half one pitch of the transfer foil when said mold halves are separated;

moving a said heating and removing means, said heating and removing means comprising a heating device and a removing device, into the space between said mold halves;

heating the transfer foil positioned at said position adjacent said second surface with said heating device of said heating and removing means;

moving said heating and removing means from the space between said mold halves;

moving said mold halves together to form a mold having a mold cavity therein;

injection molten resin into said mold cavity of said mold to form a molded product;

opening said mold by separating said mold halves after the resin has cooled;

removing the substrate film from the molded product, the molded product being temporarily attached to said first surface of said first mold half, leaving a transfer of said transfer layer on the molded product to obtain a foil decorated molding;

moving said heating and removing means into the space between said mold halves;

holding the foil decorated molding with said removing device of said heating and removing means;

moving said heating and removing means from the space between said mold halves to remove the foil decorated molding from between said mold halves; and removing the foil decorated molding from said removing device of said heating and removing means;

wherein the steps of holding the foil decorated molding with said removing device and moving said heating and removing means to remove the foil decorated molding are executed simultaneously with the steps of heating the transfer foil and moving said heating and removing means from the space between said mold halves being carried out for a next foil decorated molding to be molded.

15. The method of claim 14, wherein:

said step of heating the transfer foil is carried out only when said heating and removing means is positioned between said mold halves opposite said second surface of said second mold half.

16. The method of claim 14, wherein:

said step of transporting is complete before said step of heating begins.

17. The method of claim 14, and further comprising:

clamping the transfer foil in position on said second surface between said steps of transporting and heating.

* * * * *